May 3, 1932.    C. D. LAKE    1,856,418
ACCOUNTING MACHINE
Filed July 18, 1925    10 Sheets-Sheet 1

May 3, 1932.  C. D. LAKE  1,856,418

ACCOUNTING MACHINE

Filed July 18, 1925  10 Sheets-Sheet 2

May 3, 1932.  C. D. LAKE  1,856,418
ACCOUNTING MACHINE
Filed July 18, 1925  10 Sheets-Sheet 4

May 3, 1932.   C. D. LAKE   1,856,418
ACCOUNTING MACHINE
Filed July 18, 1925   10 Sheets-Sheet 5

INVENTOR
Clair D. Lake
BY Cooper, Kerr and Dunham
ATTORNEYS

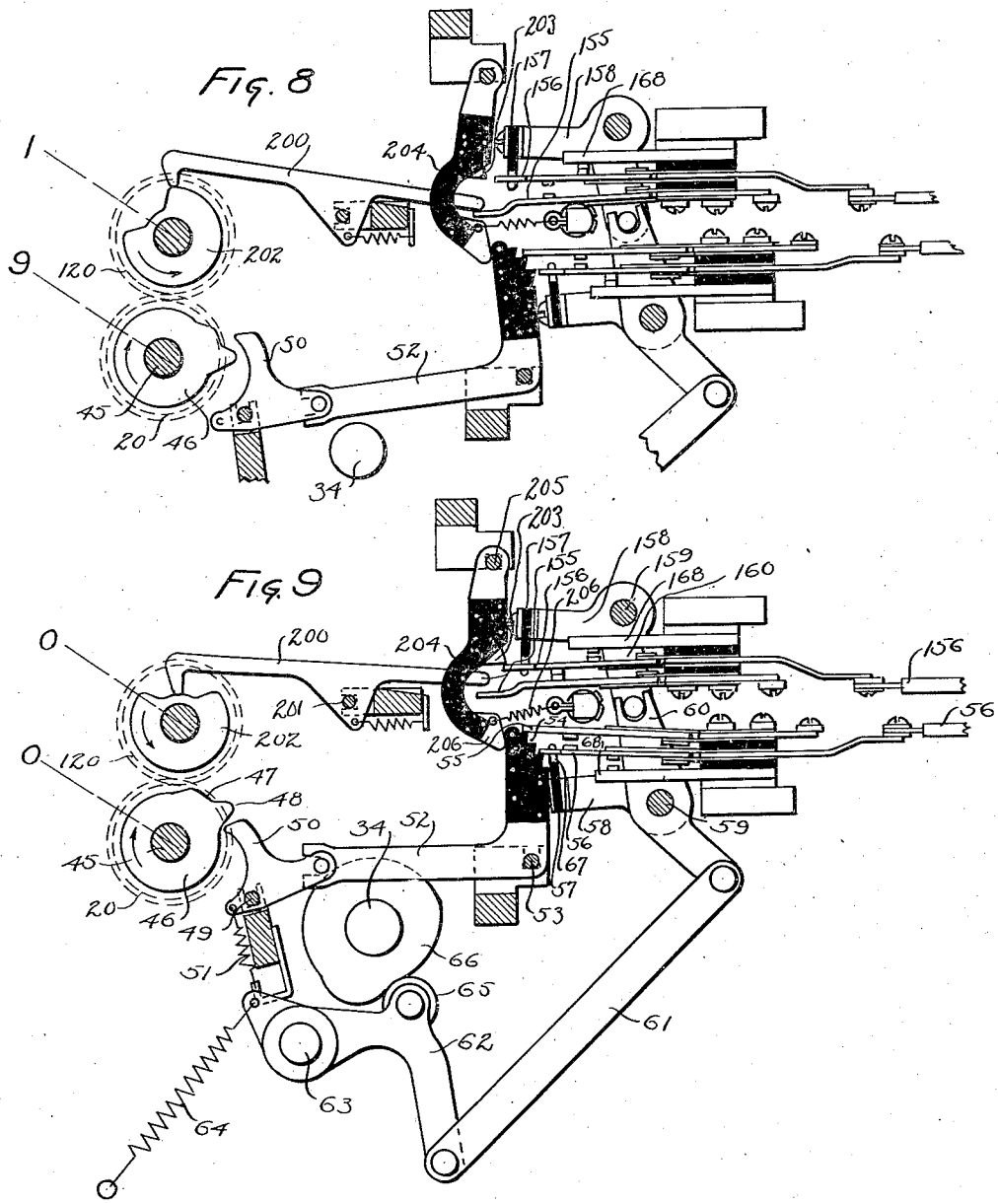

May 3, 1932.  C. D. LAKE  1,856,418
ACCOUNTING MACHINE
Filed July 18, 1925    10 Sheets-Sheet 9
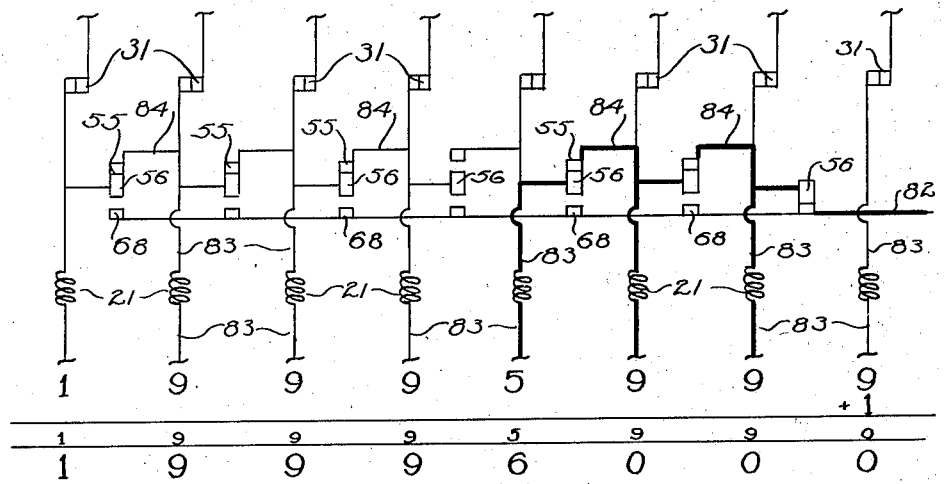
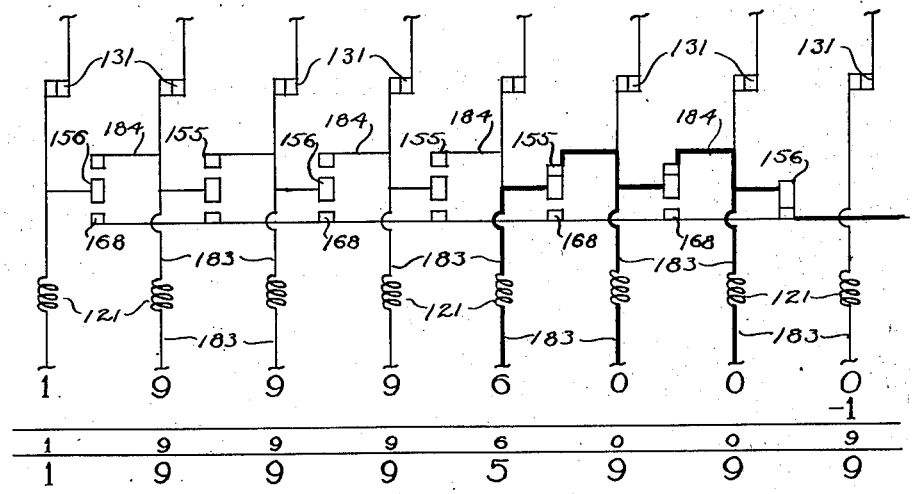
INVENTOR
Clair D. Lake
BY Cooper, Kerr & Dunham
ATTORNEYS May 3, 1932.     C. D. LAKE     1,856,418
ACCOUNTING MACHINE
Filed July 18, 1925     10 Sheets-Sheet 10
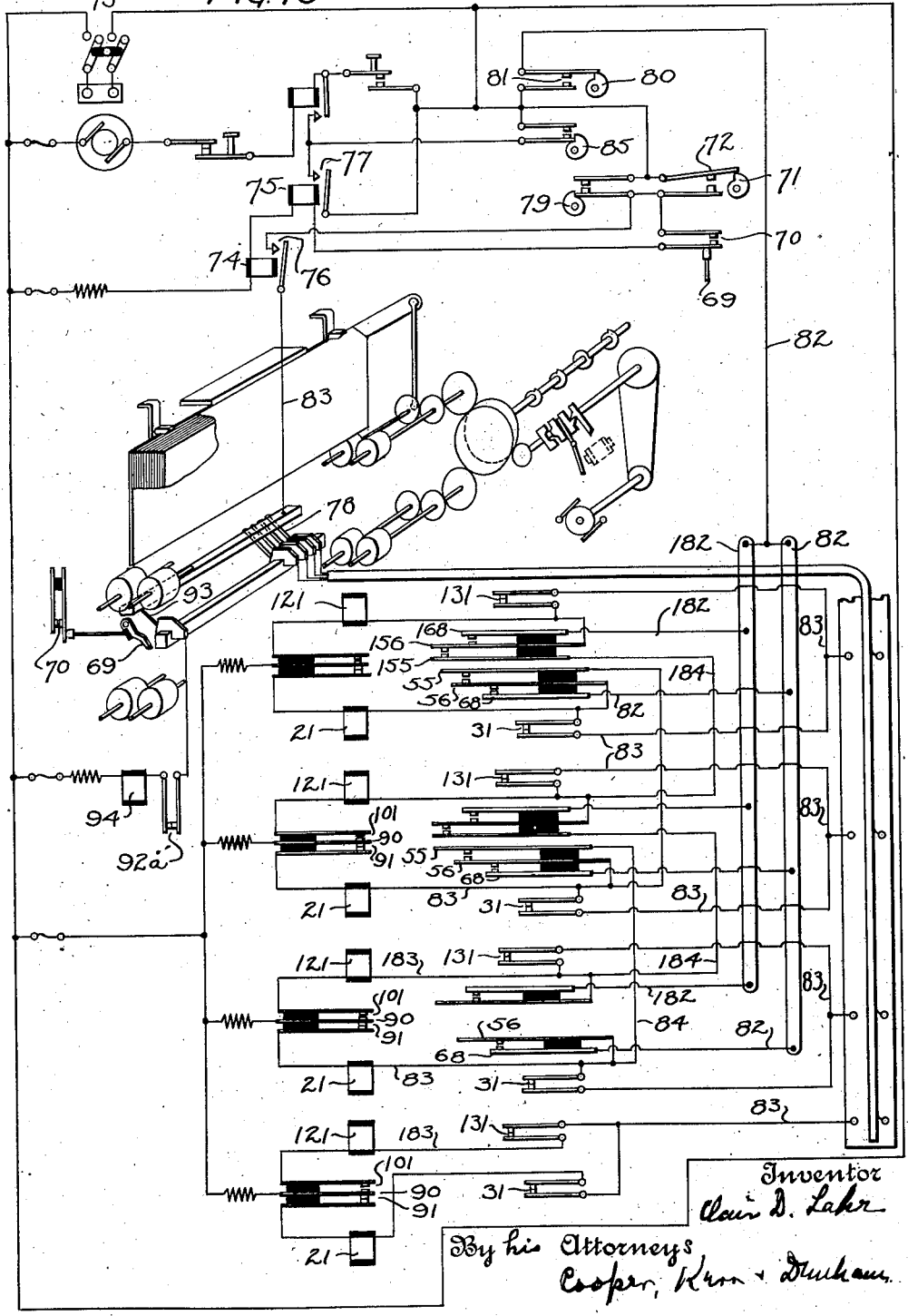

Patented May 3, 1932

1,856,418

UNITED STATES PATENT OFFICE

CLAIR D. LAKE, OF BINGHAMTON, NEW YORK, ASSIGNOR TO THE TABULATING MACHINE COMPANY, OF ENDICOTT, NEW YORK, A CORPORATION OF NEW JERSEY

ACCOUNTING MACHINE

Application filed July 18, 1925. Serial No. 44,452.

This invention covers improvements in card-controlled tabulating machines whereby such machines may be adapted for subtracting, or deducting, as well as adding.

As ordinarily constructed and used, tabulating machines are suitable solely for adding or totalizing positive amounts, no provision being made for subtracting or deducting operations, or, what amounts to the same thing, adding negative amounts.

I am aware that attempts have been made to design such machines, but none have been successful, principally because they offered no practical means for displaying negative results, or totals below zero, such as are obtained when the sum of the negative items included in a certain total is greater than the sum of the positive items included in that same total.

My present invention overcomes all previous difficulties and comprises a machine which totalizes positive or negative amounts indiscriminately and displays the total, which may be either a positive or negative quantity, in such a manner as to permit no possibility of error in reading the result.

In accomplishing the above I have used as a basis an electric transfer counter such as disclosed in my Patent No. 1,372,965, superimposing thereon a substantially similar, but inverted, counter, the two counters being so arranged that the sight openings of the two counters are adjacent, one above the other. Specific details of the present embodiment of the transfer mechanism are claimed in a division of the present application, Serial No. 257,873, filed February 29, 1928.

Each counter wheel of the lower set is geared to the corresponding wheel in the set above it so that whenever a lower wheel turns, the corresponding upper wheel turns in the opposite direction. As long as the total is positive the amount is read on the lower counter, the figures on the upper counter being covered by shutters. Whenever the total is a negative quantity the amount is read on the upper counter, the lower being obscured.

In operation, when a miscellaneous assortment of cards is fed through my machine all positive amounts are added in the regular manner on the lower counter, the control mechanism of the upper counter being inoperative, each upper wheel turning idly in the direction opposite to the lower wheel to which it is geared. Every card bearing an amount to be deducted instead of added, carries a distinguishing perforation which causes the control mechanism of the lower counter to become inoperative and the upper control mechanism operative, so the amount on that card is added on the upper counter, turning it forward. But as the upper counter is geared to the lower as above described, this results in the lower counter being turned backwards, thereby subtracting the amount from the lower counter.

This procedure requires mechanism to properly care for the transferring, carrying, and borrowing operations, all of which will be fully set forth in the following description.

Figure 1:
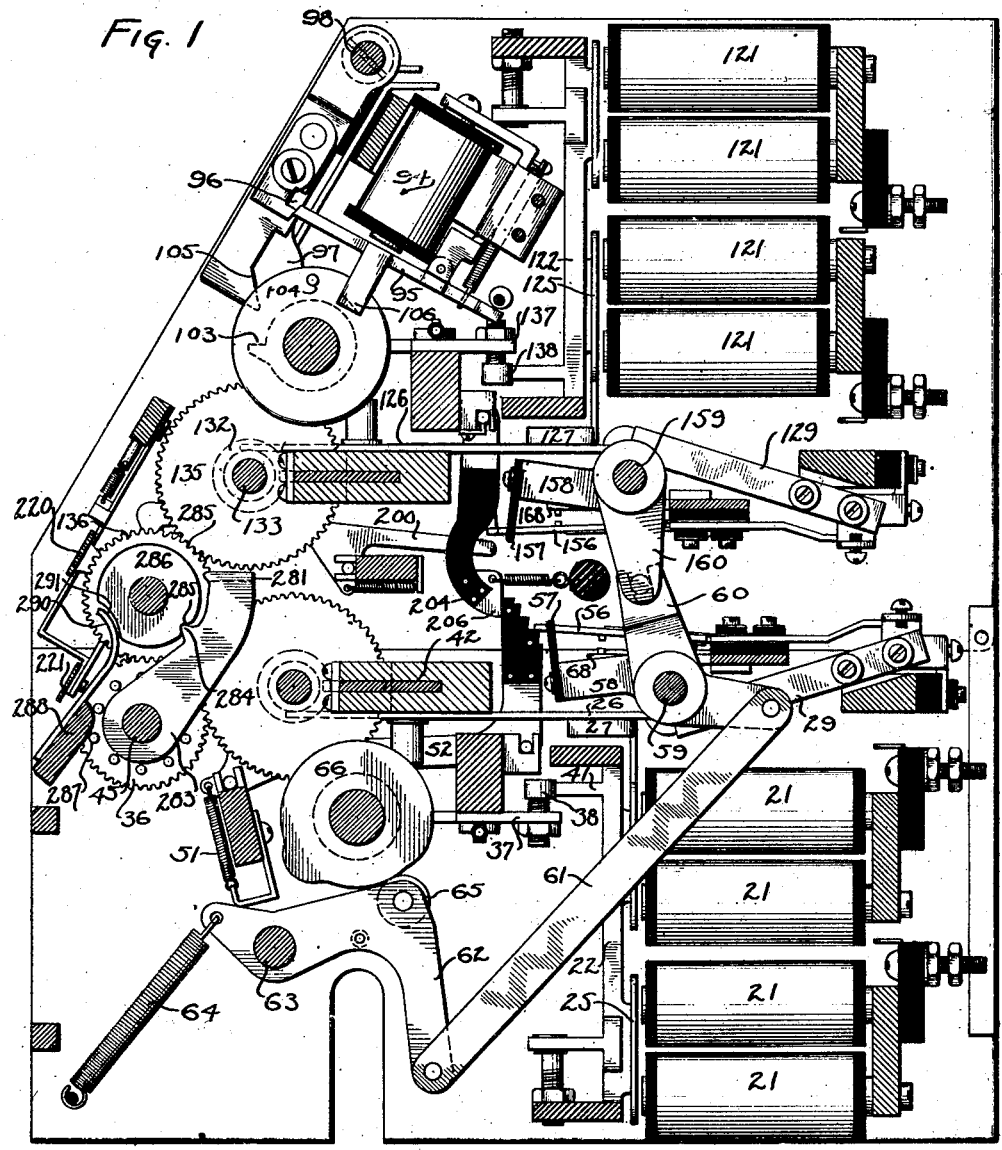
Fig. 1 is a side elevation partly in section, just inside the right hand casing of the machine.

Fig. 8, 9, 10, 11, 12, and 13 are detail views of the transfer mechanism in various operative positions.

Fig. 14 is a diagram showing positions of contacts corresponding to a particular adding computation.

Fig. 15 is a diagram showing positions of contacts corresponding to a particular subtracting computation.

Fig. 16 is a wiring diagram of the tabulating circuit, embodying the electric transfer contacts.

As my invention pertains particularly to the counter portion of the tabulating machine, and as the tabulating machines themselves are well known, I shall confine my description to the counter mechanism and such other matter as is essential to a full understanding of my invention.

In order to make the principle and operation of my machine perfectly clear I shall first describe the lower counter because when that portion of the device is thoroughly understood the operation of the additional mechanism is easily comprehended.

The counter (Fig. 3) comprises a series of eight index wheels, or number bearing discs, 20, each with ten digit spaces, and adapted to be singly, successively, or simultaneously turned to add columns of figures. Assuming the right hand disc to represent units, the next tens, the next hundreds, and so on, whenever one disc has been turned through one complete revolution or ten digit spaces, the mechanism functions without further movement to turn the disc of the next higher order one digit space.

There are eight pairs of counter magnets 21, (Figs. 1 and 2) one pair for each register wheel, and these magnets are arranged in two horizontal rows, staggered in position. As each pair of magnets functions as a single magnet, and for brevity of description, I shall hereafter refer to each pair of magnets simply as a magnet. For each magnet there is a vertical bar 22 pivoted in the frame at 23 and 24 and carrying an armature 25 facing the pole of the magnet so that on the energization of any magnet its corresponding rod 22 will be slightly rotated against the force of a spring (not shown). This movement releases a clutch lever 26 having stops 27 with which projections from armature 25 (or from rods 22) are in direct engagement. The levers 26, while normally latched, are free when released in this way to be moved sidewise about their pivotal points 28 by flat springs 29 which bear against the projections 30 on said levers (Fig. 3).

These springs 29 are insulated from the frame and constitute one member of a pair of contacts 31 in the circuit of the corresponding counter magnet 21, and when they are permitted to open, by the release of lever 26, the circuit is broken by the separation of contacts 31.

Levers 26 at their forward ends engage with the grooves of sliding clutches 32 mounted on and turning with shaft 33 which is driven by gearing from the main driven shaft 34. These clutches have teeth on one side which are carried into engagement, by the shifting of levers 26, with corresponding teeth on gear wheels 35 free on shaft 33 and in mesh with gears 36 which are fast to and concentric with register wheels 20. For relatching the armatures 25 and remaking contacts 31 I provide restoring plate 37 carrying adjustable stops 38 in the form of screws with eccentric heads. Plate 37 is reciprocated by a cam on one face of a gear mounted on shaft 34. The stops 38 act on projections 41 on rods 22 by the action of the cams during each revolution of shaft 34 when in the cycle of operations the levers 26 are thrown back to release clutches 32. The return of levers 26 is effected by slide 42 operated by cam 43 on one face of gear 44 on shaft 33. Each of the restoring cams above referred to has two steps, one of which returns the clutch levers to normal after the adding, and the other returns the levers to normal after the carry over.

It will be understood that the magnets 21 are energized by circuits containing contacts that are brought together through perforations in a card. The cards are punched at different points to indicate the numbers, and said cards are passed between the contacts to set up their numbers on the register wheels for adding them. The time of engagement of a clutch on shaft 33, depends upon the position of the hole that caused such engagement, and consequently the corresponding register wheel will be turned through an arc proportionate to such time. In other words, if the hole in the card represents the numeral 5, the register wheel will be turned five digit spaces. If it started from zero the number it will display is 5, but should it start from any other number, say, seven, then the number it will display is 2, but it will, by means of the transfer mechanism, have moved the wheel of the next higher order one digit space.

By reference to the lower half of Fig. 9, the transfer mechanism may be readily understood. Each register wheel 20 has secured to it and alongside of it on the shaft 45, an adding wheel cam 46, which has two raised parts or points of different height 47 and 48. Pivoted at 49 is a right-angled pawl or lever 50, having a spring 51 connected therewith, which pawl travels on the periphery of its respective cam 46 and this pawl engages the horizontal arm of its respective bell-crank plate 52, which is pivoted at 53.

Normally, or while the pawl travels over the lowest part of the periphery of the cam 46, the plate 52 is not affected, but when the number 9 on a register wheel comes to the indicating line the lower of the two raised parts, or 47, comes under the end of the pawl and depresses its other end with the result that the vertical part of plate 52 is thrown a step to the left. When the register wheel is advanced another digit space, the highest point of the cam, or 48, moves the pawl 50 further, with the result that the vertical end of plate 52 is moved to the left another step.

The forward top edge of plate 52 contains a series of three steps 54, the two upper and the one lower step being completely insulated, and normally upon the top or first and on the third step rest the ends of two spring contacts 55 and 56, insulated from each other and from the frame and suitably supported on the frame of the machine.

Beneath the entire row of contacts, it being understood that there is a bell-crank 52 and three contacts for each register wheel except the first wheel which has only two contacts, is a bail 57 of insulating material carried by arms 58 of a frame pivoted at 59. An upstanding arm 60 is provided for a purpose to be explained later. These arms are rocked by a link 61 connected with a right-angled lever 62 pivoted at 63 and having a spring 64 connected therewith. The lever at its knee carries a roller 65 that travels on the periphery of a cam 66 on shaft 34, said cam having points of different height as shown, there being a concentric or normal portion, a raised portion above the normal, and a depressed portion below the normal.

The bail bar has notches in its upper edge, as indicated at 67 in Fig. 9, and each contact 56 has a narrow end that fits into one of these notches, while the upper contacts 55 are wider and span the notches.

During each revolution of the driven shaft 34 the concentric portion of the cam 66 retains the bail in its normal position while the adding portion of the cycle of operations is being effected, after which the bail is lowered to effect the transfer or carry over, then the bail is raised above the normal to permit the stepped end plate 52 to return to its normal position allowing contacts 55 and 56 to latch or rest upon steps 54, and finally the bail is lowered to normal position. During each revolution of a register wheel the stepped end of plate 52 is shifted from its normal to two other positions to the left. By its movement into the first of these other positions the top contact 55 is unlatched or released from the first step, and by its second movement the lower contact 56 is unlatched or released from the third step. The operation of the mechanism may now be seen by reference to Figs. 10 to 13.

Normally the contacts 55 and 56 occupy the positions shown in Fig. 9, contact 55 resting close to the edge of the first step of plate 52, and contact 56 resting well on the third step. As the register wheel turns to bring the numeral 9 to the window, the lower of the two raised portions, or part 47 on cam 46 comes under pawl 50, and the plate 52, being shifted, unlatches upper contacts 55 and permits it to drop onto bail 57 which is at this time in its normal position. The parts are then in the positions shown in Fig. 10, so long as the bail 57 is not moved, as it will not be during the adding part of the cycle. If by the further movement of one step of the register wheel the character 0 is brought to the window, then the highest point of cam 46 shifts the plate 52 another step to the left and this unlatches or releases the lower contact from the third step, and both contacts 55 and 56 will thereupon rest upon the bail as shown in Fig. 11.

Figure 10:
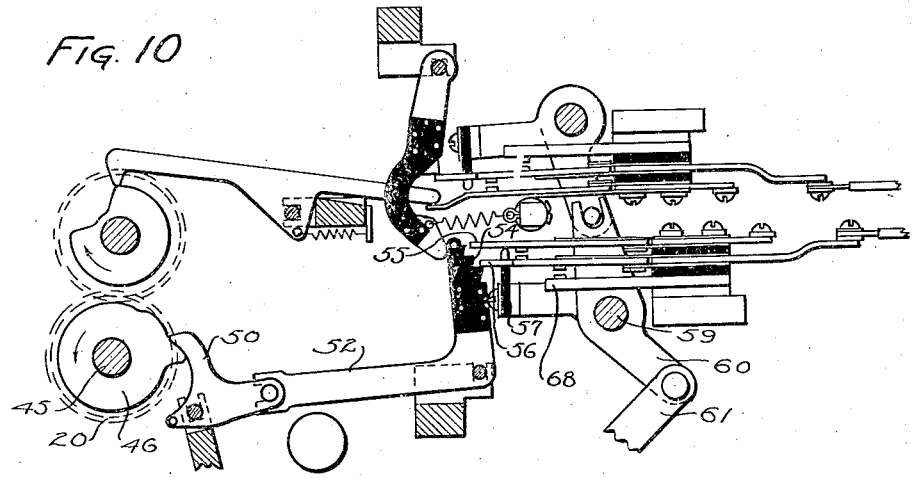
Figure 11:
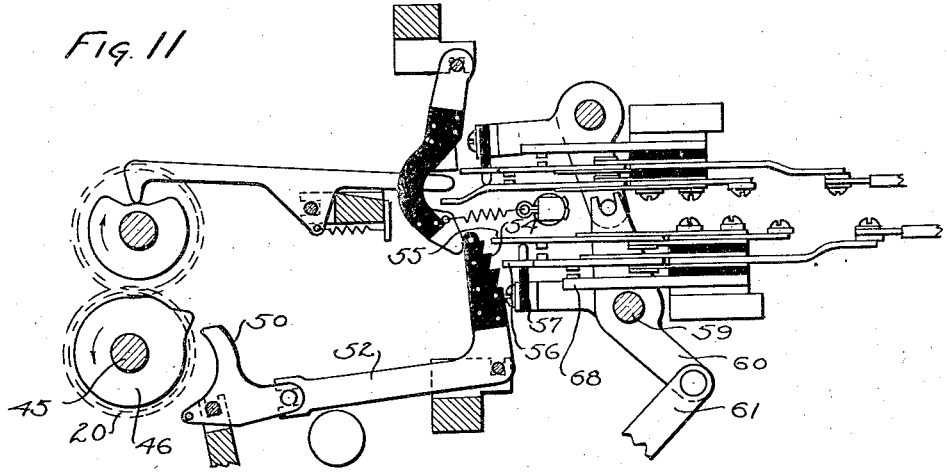
Figure 12:
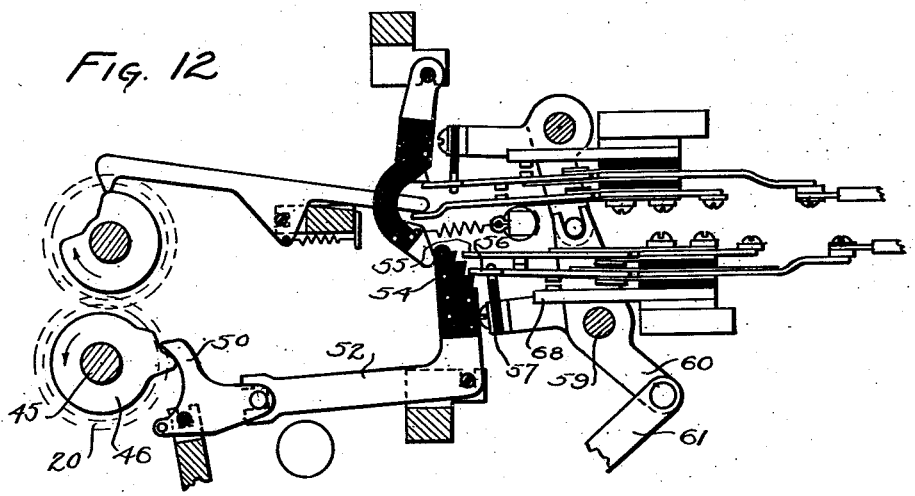
Figure 13:
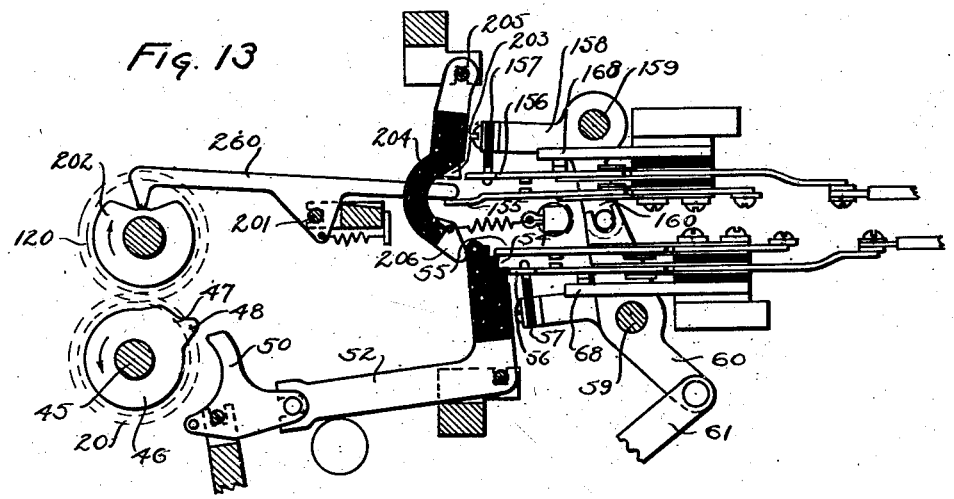

Figs. 10 and 11 illustrate the end of the adding portion of the cycle, the register wheel in Fig. 10 showing 9 and the register wheel in Fig. 11 showing 0. The parts illustrated are in the set-up condition, with contacts 55 and 56 separated. Fig. 12 illustrates the condition of the parts of Fig. 10 after the adding but with the bail lowered, but owing to the register wheel indicating 9 the contacts 55 and 56 only are closed to establish electrical connection with the register wheel of next higher order. Current however cannot flow through these contacts until plate 52 permits contacts 68 to close as shown in Fig. 13 to establish a circuit as hereinafter described. Fig. 13 shows the parts of Fig. 12 after the adding with bail lowered and register wheel has moved from 9 to 0 position.

Referring now to Fig. 16, which is a wiring diagram of the system, for an explanation of operation. This diagram represents the tabulating machine and the circuits used in operating it, including the improvements in my present invention. Bearing in mind the manner in which such machines are habitually used and operated by punched cards, the following is the plan of operation. When the cards are being fed through the machine, lever 69 is moved so as to keep contacts 70 closed, that is, they are kept closed by each card as it passes. At this instant cam 71, operated by the machine, closes contacts 72, whereupon the circuit from the source 73 is closed, energizing a counter control relay 74 and motor control relay 75, which closes contacts 76 and 77 respectively. Assuming that the machine is operating and the cards passing through it, whenever a brush 78 comes over a perforation in a card a path for the current is established through such counter magnet as may be determined by the position or column in which said perforation lies, and the corresponding clutch is shifted to engagement and remains so during the adding, and until the clutches are retracted or knocked out of engagement. 79 is a safety cam to break the circuit between cards.

At this point, that is to say when the clutches have been restored, the cycle of operations is not complete, and the remaining portion of the card cycle is utilized for effecting by electrical means such carrying or transferring from one registering wheel to the next as the positions of such wheels and the conditions of adding may require.

There is provided a carry control cam 80 which at this instant closes contacts 81 which carry the circuit to a conductor 82 connected to all the lowermost contacts 68 (Figs. 9 and 16), which lie under contacts 55 and 56. If at the moment no wheel is in position to expose a figure near the upper limit of 0 and there are no figures to be added requiring any carrying or shifting of any wheel by one step, then all contacts 55, 56, and 68 will be out of engagement and no path for the current is provided beyond the contacts 68.

It may happen, on the other hand, that such conditions exist as are represented in Fig. 14, in other words, the exposed numerals may be 19,995,999, and the amount to be added is one unit. The counter magnet 21 at the right in Fig. 14 will therefore be energized during the adding portion of the cycle and advance its register wheel one unit space. As there is no wheel below this one, there is of course no carrying device up to the units wheel, but the units, tens, and hundreds wheels, and all others which display nines will have shifted their respective plates 52 to allow the respective contacts 55 and 56 (contact 56 only in the case of the units) to assume the positions shown in Fig. 10. Thereupon, by the movement of the units wheel one space, the 0 of that wheel is displayed and its adding cam 46 has brought the contacts 56 and 68 into positions shown in Fig. 11. The bail is then lowered to the position shown in Figs. 12 and 13, allowing contacts 56 and 68 to close in all cases involving transfer as shown in Fig. 13, and allowing contacts 55 and 56 to close as shown in Fig. 12 except in the case of the units.

At this point the adding part of the cycle is complete, as well as the setting up of the transfer controlling means.

The next phase takes place instantly at the time contacts 81 controlled by cam 80 (Fig. 16) are closed. The transferring is instantaneous as the circuit is established at once from the contacts 68 and 56 controlled by the units wheel to and through the counter magnets of the tens wheel by wire or other connections 83. Clutch lever 26 controlled by magnet 21 is released or unlatched setting the clutch ready to be brought into operation to revolve the tens wheel one step. But the contacts 55 and 56 controlled by the tens wheel which at that instant exhibits 9 will at that moment be in the position shown in Fig. 12, so that current will pass by wire 84 to contacts 55, 56 and thence by wire 83 of the hundreds wheel through the latter's counter magnet, and the controlling means is released or set to advance the hundreds wheel one step.

The contacts controlled by the hundreds wheel which is also assumed to exhibit 9, control the means for advancing the thousands wheel one step the same as explained in the preceeding paragraph. It will be observed that there are other wheels of the series at 9 in which case their parts will be in the position shown in Fig. 10, and as the wheels of the next lower order of units is not moved to the zero position these wheels are not affected. This completes the second phase of the cycle. In Fig. 14 the controlling circuits for the tens, hundreds, and thousands wheels during this second phase are shown by heavy lines.

The carrying operation now takes place and the same clutches which perform the adding operation engage and revolve simultaneously the tens, hundreds, and thousands wheels one step. Current is now broken by cam and contact 85. The clutches are then retracted and reset by the same means as were affected for this purpose after the adding operation, so that the adding, carrying, and restoring operations are all carried out by the same devices.

At or near the end of the cycle or revolution of the driving shaft of the machine the bail 57 is raised above the normal position by the high part of cam 66, whereby the two contacts 55 and 56 are raised by the bail sufficiently to permit the lever 52 to swing back to the right and re-engage or latch the said contacts on its first and third steps 54.

Now that I have explained how my machine handles the ordinary operation of adding positive numbers I shall describe how it functions to add negative (substract positive) numbers.

This operation is controlled by the upper half of the machine, which is, in construction and principle of operation, substantially the same as the lower half which has been described, except that it is inverted. There are some differences which will be pointed out.

During the adding operation already described current flows to the lower magnets by way of flat spring contact 92 (Fig. 2) to the set of magnets controlling the ordinary adding operations. Every record card bearing an amount to be deducted instead of added bears a distinguishing perforation through which contact is made by brush 93 (Fig. 16) by way of contact 92 (Figs. 4 and 16) before any of the other perforations on the card are in position to affect the counter control magnets. By the making of contact through brush 93, magnet 94 is energized, armature 95 (Figs. 1 and 2) is drawn up so its outer end will be opposite notch 96, whereupon bail 97, pivoted at 98, will be swung to the right by spring 99 so the insulated contact strip 100 carried by the bail will allow contact spring 90 to move to the right sufficiently to break contacts 91 and establish contacts 101 with contact spring 102, whereupon the current will flow through the upper set of magnets instead of the lower set, and during the passage of that particular card the upper, or deducting, mechanism, will be in control of the register wheels. It will be understood that there are a pair of contacts 91 and 101 corresponding to each register wheel. Bail 97 and armature 95 are restored to normal position at the end of each card cycle by cam 103 and pin 104 acting against bail arm 105 and armature arm 106 respectively. This also restores contacts 92 and 92A.

In describing the upper (deducting) mechanism I have designated those parts which correspond to similar parts in the lower (adding) mechanism by the same numbers plus 100, whereby we have an upper counter comprising eight index wheels 120, each geared to a corresponding wheel 20 below it, eight upper counter magnets 121 with corresponding vertical rods 122 each carrying an armature 125. We have eight clutch levers 126 having stops 127 with which projections from armatures 125 are engaged.

The upper clutch levers 126 are free when unlatched from the armatures to be moved about their pivot points 128 by the springs 129 which bear upon the projections 130 on said levers. The lever control circuit is broken at 131 when lever 126 is unlatched.

Levers 126 at their forward ends engage clutches 132 on shafts 133 which is driven by gearing from shaft 34. These clutches engage jaws on gear wheels 135, free on shafts 133 and in mesh with gears 136, each of which is fast to its corresponding register wheel 120.

For relatching the upper armatures 125 there is a restoring plate 137 with stops 138. Plate 137 is reciprocated by a two-step cam on one face of a gear on the shaft which carries restoring cam 103. Return of levers 126 is effected by slide 142 operated by a 2-step cam on one face of gear 144 on shaft 133.

This upper mechanism is provided with spring contacts 155 and 156 corresponding to lower contacts 55 and 56. Above the entire row of contacts is a bail 157 of insulating material carried by arms 158 pivoted at 159. This frame has a depending arm 160 interlocking with upstanding arm 60 so that the movement of the upper bail is controlled by the same cam 66 which actuates the lower bail. As the lower bail is raised the upper bail is lowered, and vice versa.

Bail 157 has notches in its lower edge and each contact 156 has a narrow end that fits into one of these notches, while each contact spring 155 spans the notches. An upper contact 168 is provided corresponding to 68 of the lower set.

Contact 155 is controlled entirely by the rear end of lever 200 pivoted at 201, the forward end of the lever resting on cam 202, there being one cam 202 fast to each upper register wheel. Contact 156 is controlled by bail 157 and by step 203 on arm 204, the upper end of which is pivoted at 205 and the lower end 206 kept in contact with the upper end of the upright portion of plate 52 by a coil spring. The major portion of arm 204 is made of insulating material as indicated.

Figure 2:
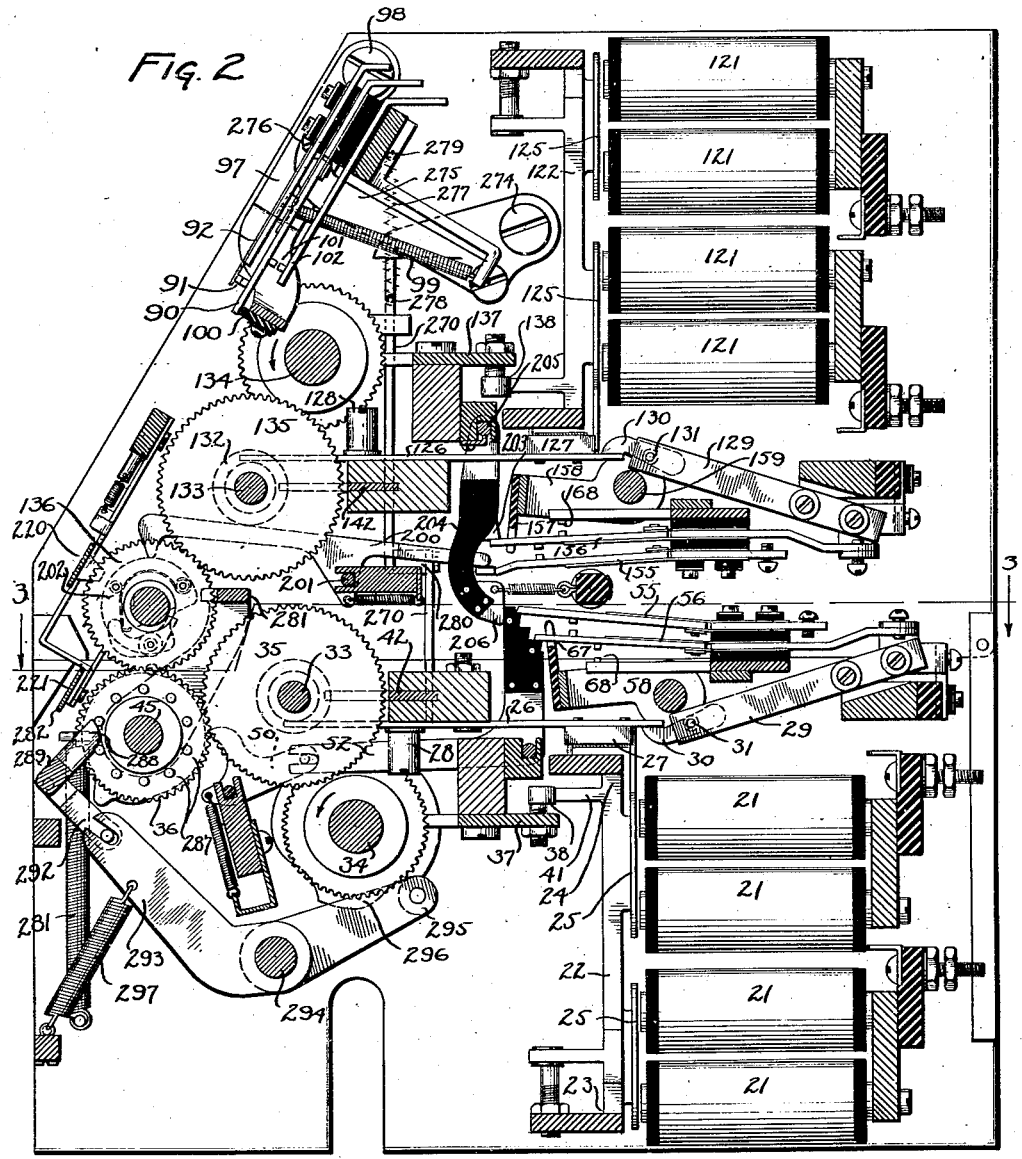
Fig. 2 is a side elevation somewhat similar to Fig. 1, but taken between counter discs.
Figure 3:
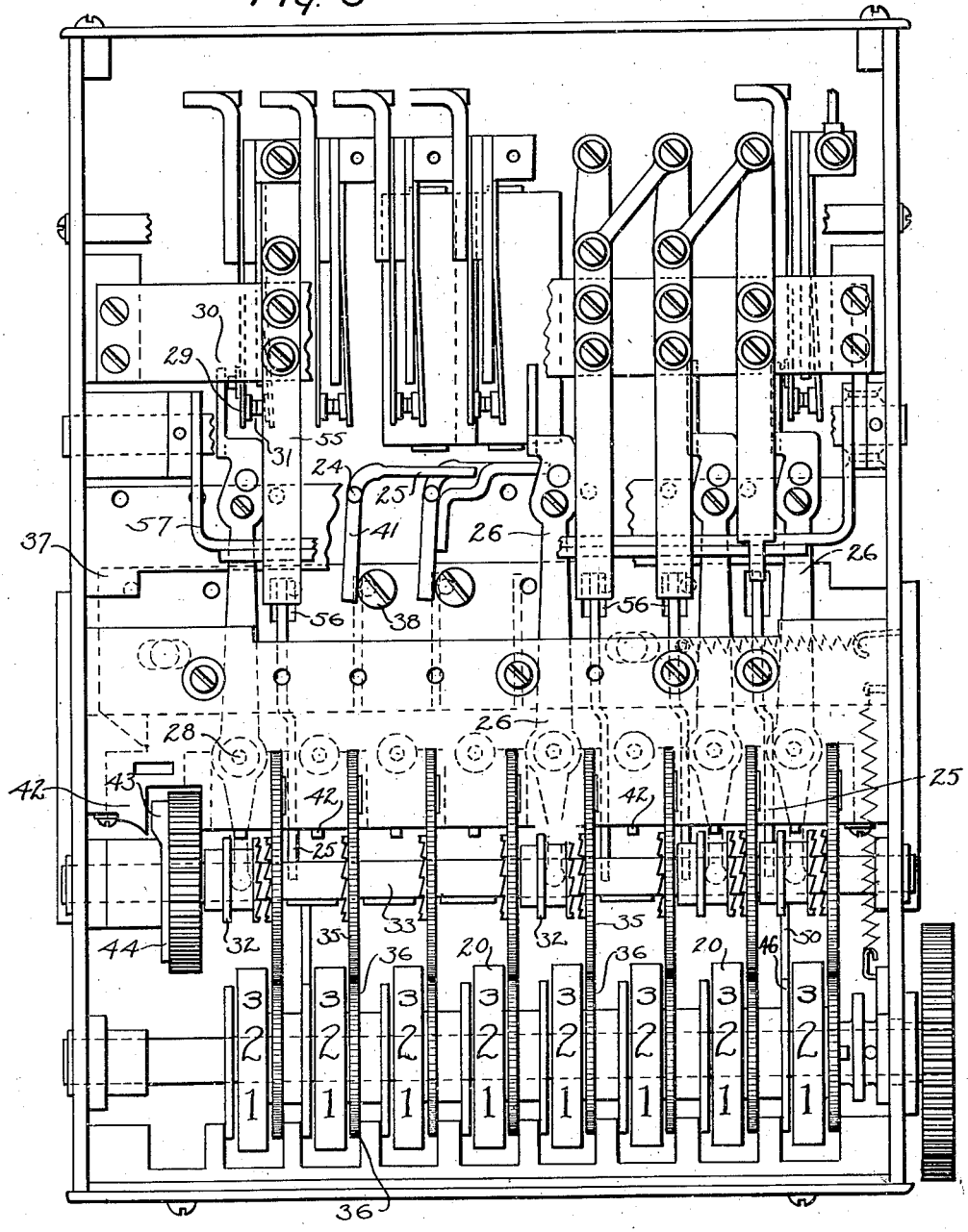
Fig. 3 is a plan of the lower section of the machine, on line 3—3 of Fig. 2.

Normally the contacts 155 and 156 occupy the positions shown in Fig. 2, with the front end of lever 200 resting on the concentric portion of cam 202, thereby keeping 155 out of contact with 156. Contact 156 is resting against shoulder 203 on arm 204 and is thereby kept out of contact with 168. This is the position during the adding portion of the cycle.

Assuming that a negative card is in control, the upper register wheels are turning counter-clockwise and adding on the upper wheels thereby turning the lower wheels clockwise and subtracting on the lower wheels. Assuming also that the result of the operation is a positive amount the operator must read the lower counter, the upper being obscured as will be explained.

When subtracting it is evident that the operation, so far as passing from 10 to 9 is concerned, must be the reverse of the adding operation already described in which we passed from 9 to 10. Therefore whenever in any pair of wheels the wheel of higher order stands at 0 it must be in receptive condition so that when the next lower wheel turns from 0 to 9 the higher will be clutched to the source of power and turned also.

Thus we have in Fig. 9 the lower counter wheel reading 0 (the upper counter wheel also reads 0, but that is immaterial). Lever 200 is resting on the recessed portion of cam 202 thereby allowing contact 155 to rest on 156 (the latter being latched on 203) which is the receptive position so that if current is sent through those contacts, counter wheel 120 will be rotated one step forward and counter wheels 20 one step backwards to 9.

If now the lower wheel of the pair under consideration be turned backwards from 0 to 9 the raised portion 48 of cam 46 pushes angle lever 50 to the right unlatching 156, and we have the condition shown in Fig. 8, assuming of course that the upper bail 157 has been retracted. It will be seen that arm 204 has been pushed to the left so that contact 156 has slipped off of shoulder 203 and is in contact with 168, while lever 200 is again on the high portion of cam 202 and therefore is holding contact 155 away from 156.

What happens under these conditions may best be shown by Fig. 15 in which is shown graphically the reverse of the adding operation illustrated in Fig. 14. The numerals exposed are 19,996,000 and the amount to be subtracted is 1 unit. Counter magnet 121 at the right in Fig. 15 will be energized during the adding part of the cycle and will advance its register wheel 120 one space, thereby moving its corresponding lower wheel backwards one space to 9, and all other wheels which display zeros will have their contacts 155 and 156 in contact as already described and as shown in Fig. 9. The movement of the units wheel from 0 to 9 has brought its contacts 156 and 168 into position (Fig. 8) so that when bail 157 is retracted 156 and 168 form a contact.

At this point the subtracting part of the cycle is complete and the transfer controlling means is set up. Now contacts 81 are closed by cams 80 (Fig. 16) and current is established from contacts 156 and 168 controlled by the units wheel, to and through the counter magnet of the tens wheel, by wire or other connection 183. Clutch lever 126, controlled by magnet 121, is unlatched, setting clutch ready to be brought into operation to revolve the tens wheel one step. But the contacts 155 and 156 controlled by the tens wheel which at that instant exhibits 0 will be in position shown in Figs. 9 and 15 so that current will also pass by wire 184 to contacts 155—156 and thence by wire 183 of the hundreds wheel through the latter's counter magnet and its controlling means is set to advance the hundreds wheel one step.

The contacts controlled by the hundreds wheel, which is also assumed to exhibit 0, control the means for retarding the thousands wheel one step in the same manner as described in the preceding paragraph.

In Fig. 15 the controlling circuits for the tens, hundreds, and thousands wheels are shown in heavy lines.

The borrowing operation now takes place as the clutches engage and revolve simultaneously the tens, hundreds, and thousands wheels one step and we have the correct result 19,995,999. Current is now broken by cam and contact 85, all contacts are brought back to normal position by the bails 57 and 157 and the machine is ready to handle the next cards.

Up to this point we have assumed that the result after an adding or deduction operation would be a positive number, or greater than zero. We must now consider the condition when the result is below zero, or negative. For instance if the number 200 appeared on the lower counter (where we have up to this time made all our readings), and we deducted 400 (added −400), the answer we want is minus 200 (−200), but what we really get on the lower counter is 99,999,800. Or if we had 1000 on the counter and subtracted 12,345 (added −12,345) we want minus 11,345 for an answer, but we really get 99,987,655, which is of no use to us.

Figure 5:
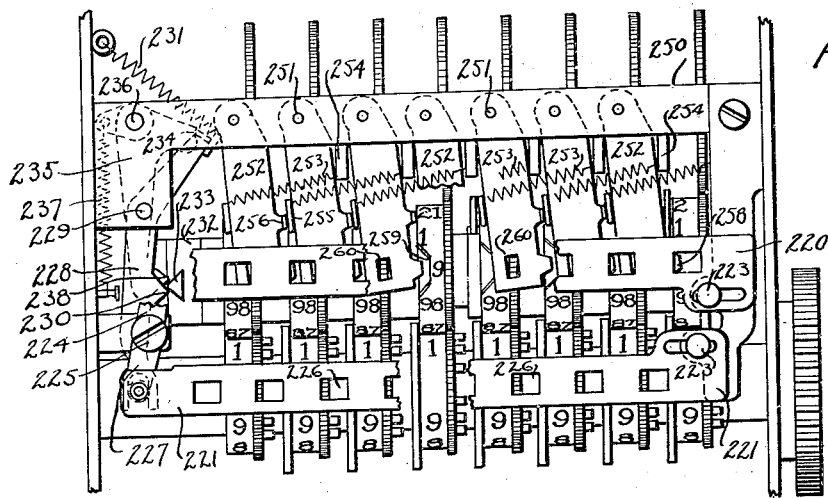
Fig. 5 is a front view of the upper counter with shutters.
Figure 6:
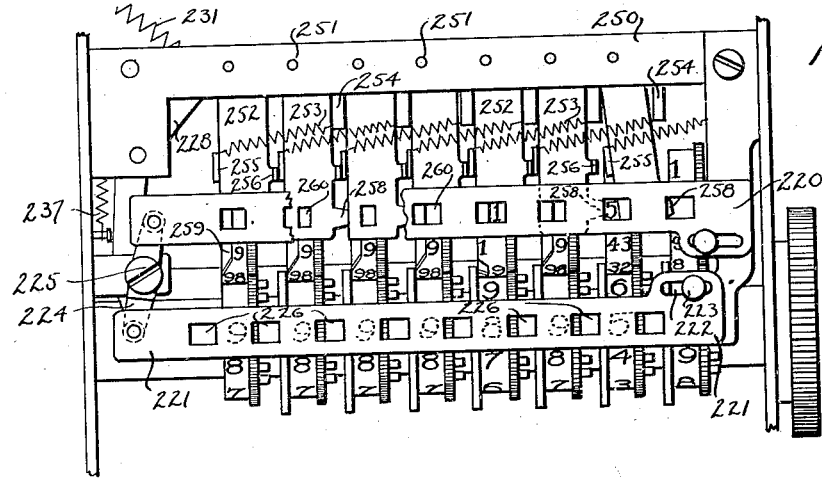
Fig. 6 is similar to Fig. 5 but with the secondary shutters in a different position.
Figure 7:
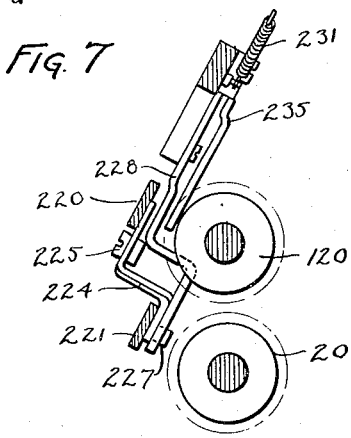
Fig. 7 is a side elevation on line 7—7 of Fig. 5.

To overcome this condition I transfer the reading point from the lower to the upper counter by a system of shutters which I shall now describe (Figs. 5, 6, and 7).

Directly in front of the reading lines of the upper and lower counters are flat bars 220 and 221 respectively. These bars are provided at their right hand ends with horizontal slots 222 engaging studs 223 and free to slide thereon. The left hand ends of the shutter bars are pivoted on the upper and lower ends of the equal armed lever 224, pivoted at 225 so that when bar 220 is moved to the right bar 221 moves to the left, and vice versa. Each shutter bar is provided with a series of sight openings 226, one corresponding to each register wheel and so located on the bars that when bar 221 is in position to expose the lower register wheels to view through said openings 226, upper bar 220 obscures all the upper register wheels, and vice versa.

Engaging stud 227 at the lower end of lever 224 is the jaw of a shifter lever 228 pivoted at 229. This lever has a cam shaped projection 230. When the lower counter is to be read the upper end of lever 228 is drawn to the left by spring 231, in which position it holds shutter 221 to the right, the lower register wheels are exposed, and the upper wheels hidden.

Attached to and turning with the highest (furthest to the left) register wheel of the upper counter is a cam 232 bearing a projection 233 so located that as that wheel passes from 9 to 0 projection 233 engages with projection 230 on lever 228 and pushes the lever to the left until it is latched by catch 234 on lever 235 pivoted at 236 and biased towards locking position by spring 237. While in this position the shutter bars conceal the lower counter and reveal the upper counter, as in Figs. 5 and 6.

Whenever the upper register wheel at the extreme left passes back from 0 to 9 cam 233 trips catch 234 by engaging projection 238 at the lower end of latch lever 235 and pushing the upper end of it to the left whereupon spring 231 pulls lever 228 to the left and shifts shutter bars 220 and 221 so the upper counter is again obscured and the lower one again readable.

The shutter mechanism just described is sufficient to always insure a correct reading of a negative result so long as that result has only one significant figure. If the result has more than one significant figure the result is correct up to and including the first significant figure, the remaining digits being always one too low, as for instance if the correct digit is 4 the counter will show 3. A little consideration will show why this is so. Any positive (above zero) result is always correct and visible on the lower counter. Any negative (below zero) result always has its correct, but invisible, complement on the lower counter. Each wheel of the upper counter is geared individually to the corresponding wheel on the lower counter, and the sum of the two exposed digits (if both are exposed at the same time) on any pair of wheels is always 0 or 10. But the sum of any pair of digits of a number and its complement is always 9, except the first pair of significant digits the sum of which is 10. For example take the number 99,998,950 and its complement 1050; the sum of the units digits is 10 (or zero), the sum of the tens digits (the first significant figures) is 10, but the sum of the hundreds, thousands and all other pairs of digits is each only 9. As the number we want to read on the upper counter is always the complement of the number on the lower counter it is necessary to provide means to correct all digits to the left of the first significant figure and thereby display the correct result.

This is accomplished by my system of auxiliary shutters, together with two rows of figures on the upper register wheels. The row on the left (Figs. 5 and 6) comprises the numbers which are the true complements of those on the lower wheels, and are the numbers which have been referred to thus far in my description. In other words, the sum of the digit at the reading opening of any lower counter wheel plus the left digit at the reading opening of the corresponding upper wheel, is always 10. In the right hand row of figures however, the digits are so placed that the digit at the lower opening, plus the right hand digit on the corresponding upper wheel, is always 9. The upper counter wheel at the extreme right has only the left hand column of figures, none other being ever needed in the units column.

My system of auxiliary shutters is adapted to expose the digit in either the right hand or left hand column of each of the upper register wheels, and whenever a result is shown on the upper register the device functions automatically to expose to view the left hand digits on all wheels up to and including the first significant figure, and the right hand digits on every wheel to the left of the first significant digit, as is necessary in order to show the correct answer as explained above.

Above the upper counter is a bar 250 fast to the frame of the machine. Pivoted at points 251 on bar 250 are the swinging shutters 252, one for each counter wheel except the units wheel. Each shutter 252 is drawn to the right by a spring 253 one end of which is fast to the shutter and the other fast to a pin 254 in bar 250. Each shutter has an abutment 255 against which bears the stop 256 of the next adjoining shutter on the left, except when they are held apart by the action of the machine, as will appear. Each shutter also has a projection 258 extending to the right and which either bears against the rim of the next wheel to the right or extends into a recess 259 cut into the rim of said wheel. Each shutter is provided at the reading line with a sight opening 260 about half the width of opening 226 in bar 220.

Recess 259 is provided in each upper counter wheel by cutting away the zero space in the left hand column of digits. It should be understood that in the tabulating art it is customary not to show the zero digit on the counter wheels but to simply leave the space blank, so whenever a blank space appears at the reading opening it means 0, except when it is to the left of the last significant figure, when it is ignored.

Normal position of all counter wheels and shutters is shown in Fig. 5, in which all lower counter wheels have their zeros on the reading line. The left zero on each upper wheel is also on the reading line. Shutter bars 220 and 221 are in such position that the lower counter wheels are obscured. The openings 226 in the upper shutter bar 220 are opposite the counter wheels, but the wheels themselves cannot be seen, the only thing visible through the openings 226 being the zero space of the units wheel and portions of the auxiliary shutters 252, which, all being blank, means zero everywhere.

If now a card be run through the tabulator with perforations indicating that 1050 be deducted, as explained above this will result in some of the upper counter wheels being advanced and the wheels of the lower counter being revolved backwards thereby so the lower counter will read 99,998,950 which is the complement of the result we want to show on the upper counter. This is accomplished as follows.

The units digit being 0, neither unit wheel moved. The lower tens digit being 5, the upper tens wheel is turned to the complement of 5, which is 5. As the upper tens wheel was leaving its zero position it forced projection 258 of the hundreds shutter 252 out of the zero recess of the tens wheel to a position against the rim of the tens wheel, whereby all shutters to the left of the tens wheel are pushed to the left as shown in Fig. 6. This permits the 5 digit to be read in the left column of the tens wheel, which is exposed at the left of the tens shutter.

In the hundreds column we have 9 on the lower counter and want 0 on the upper wheel (not 1, which is the real complement of 9). In the thousands column we have 8 on the lower register and want 1 on the upper (not 2, which is the real complement of 8). On all lower wheels to the left of the thousands column we have nines, and on each of the corresponding upper wheels we want a blank (not a 1, which is the real complement of 9). As already described, all shutters 252 to the left of the tens wheel have been displaced to the left. This brings their sight openings 260 opposite the right hand columns of digits on their respective counter wheels, which means that on each of those wheels the number exposed is one less than the complement of the number on the wheel below it, and there is exposed on the upper register the result 1050, which, being on the upper counter means minus 1050, or in other words 1050 less than zero.

Any other similar operation or computation would work out in the same manner as the example just explained.

As a matter of precaution, while the lower counter is in operation the upper clutches are locked so they cannot engage, and while the upper counter is in commission the lower clutches are locked out.

This is accomplished by means of locking plate 270 (Figs. 2 and 4) working in co-operation with clutch restoring plates 42 and 142 through slots in those plates. Plate 270 is notched as at 271 and 272 adjacent plates 42 and 142 respectively. While the lower counter is in operation plate 270 is in such position that its notch 271 is opposite, or in other words in line with plate 42 so that the regular movement of plate 42 is not interfered with. When the upper counter is in operation plate 270 is in position so that the full width of blade 270 enters the slot in plate 42 and as a consequence plate 42 is held to the left and all clutches 32 are held out of engagement. Plate 142 and clutches 132 are locked in a similar manner while the lower counter is in operation.

Plate 270 is actuated downwardly by arm 273 pivoted at 274 and connected by link 275 to arm 97 at 276. Whenever arm 97 is swung to the right to put the upper counter into commission, as has been explained, arm 273 is swung downwardly by link 275. Whenever arm 97 swings back to the left arm 273 rises and plate 270 is drawn to its upper position by coil spring 277 attached to 270 at 278, and to a rigid part of the machine at 279. There is an offset in plate 270 at 280 for structural reasons only.

In Figs. 1 and 2 there is shown a notched bail 281 which extends across the machine in the rear of the lower counter and co-operating with resetting clutches 282, said clutches (one on each register wheel) being in contact with bail 281 at home position; the contact being sufficient to hold the clutch out of engagement with the notch in the counter shaft.

Bail 281 is carried on shaft 45 by a pair of arms 283 one of which has a projection 284 which in home position rests in notch 285 in the rim of resetting disc 286, in which position bail 281 holds all clutches 282 out of engagement. During the resetting operation disc 286 revolves, projection 284 is forced out of notch 285, and clutches 282 are permitted to function to reset the counter wheels.

Figure 4:
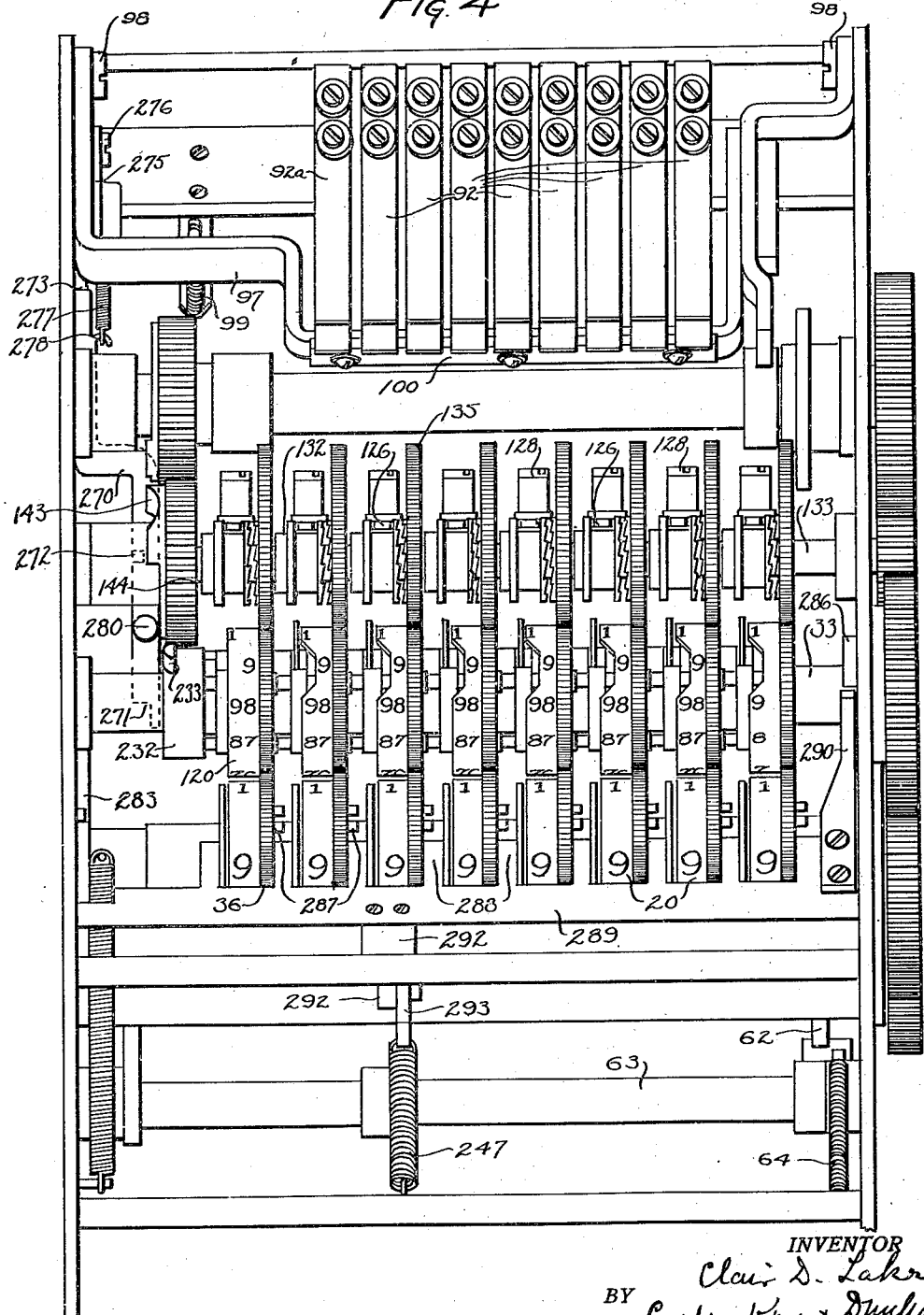
Fig. 4 is a front view of upper and lower counters with shutters removed.

Each lower counter wheel has projecting from its side a ring of pins 287, and co-operating with the pins on each wheel is a finger 288 of bail 289 which extends across the machine in front of the lower counter (Figs. 1, 2, and 4). In normal position these fingers 288 contact lightly with pins 287 as they pass during rotation of the counter wheels, the purpose being to prevent the counter wheels over-running if they should be turned rapidly. In normal position the curved arm 290, fast to bail 289, rests in recess 291 of disc 286 but during the resetting operation finger 290 rests on the circumference of the disc thus removing the fingers of the bail from any contact with pins 287 during that operation.

Bail 289 has a downwardly projecting arm 292 (Fig. 2) engaging an arm of bent lever 293 which is pivoted on cross bar 294, the other arm of lever 293 having a roller 295 riding on cam 296. Coil spring 297 holds the roller in contact with the cam. During the restoring operations of plates 42 and 142 roller 295 drops into low spots on cam 296 and permits fingers 288 to more closely engage pins 280, as shown in Fig. 2, thus preserving the alignment of the counter wheels during the restoring operations, or adjusting their alignment if adjustment be necessary.

I claim:

1. In a record controlled accounting apparatus, a record reading means, means for automatically presenting records thereto, means controlled by the reading means for adding promiscuous positive and negative amounts regardless of their relative values derived from the automatically presented records, and means controlled by the adding means for disclosing the algebraic totals of such additions.

2. In a record controlled accounting apparatus, in combination with a record reading means, means for automatically presenting records thereto, means controlled by the reading means for adding promiscuous positive and negative amounts regardless of their relative values derived from the automatically presented records, and means controlled by the adding means for continually revealing the algebraic totals of such additions.

3. In a record controlled accounting apparatus, in combination, a record reading means, means for automatically successively presenting records thereto and for automatically operating the apparatus, means controlled by the reading means for adding promiscuous positive and negative items regardless of their relative values derived from the records, means for automatically operating said last mentioned means by the aforesaid operating means to obtain the true totals of said items, and means including a shutter device for disclosing the totals of such additions.

4. In a record controlled accounting apparatus, in combination, a record reading means, means for automatically successively presenting records thereto and for automatically operating the apparatus in timed co-ordination with the presentation of the records, means controlled by the reading means for adding promiscuous positive and negative amounts regardless of their relative values, derived from the records, means for operating said adding means by the aforesaid operating means, and means including a plurality of accumulators for revealing the true totals of such additions.

5. In a record controlled accounting apparatus, in combination, means for automatically presenting records and for automatically operating the machine in timed coordination with the presentation of such records, means for adding promiscuous positive and negative amounts regardless of their relative values derived from the records, and means including a plurality of accumulators for calculating the true totals of said amounts and shutters cooperating therewith for disclosing the totals of such additions.

6. In a record controlled accounting apparatus, in combination, means for automatically presenting records and for automatically operating the machine in coordination therewith, means for adding promiscuous positive and negative amounts regardless of their relative values derived from the records, and means for disclosing the true totals of such additions, said disclosing means including one accumulator for displaying positive totals and another accumulator for displaying negative totals.

7. In a record controlled apparatus, in combination, with record reading means, means for automatically presenting records thereto and for automatically operating the machine in coordination therewith, means comprising accumulators for adding promiscuous positive and negative amounts regardless of their relative values derived from the records by said reading means, and a shutter device operable to disclose true positive totals on one of said accumulators and true negative totals on another of said accumulators.

8. In an accounting apparatus in combination with automatic machine operating devices, means comprising an accumulator operable by said operating devices, control devices therefor operable automatically by the machine for adding in said accumulator promiscuous positive and negative amounts and disclosing thereby positive totals of such additions, and means including an auxiliary accumulator also operated by said machine operating means for disclosing negative totals of such additions.

9. In an accounting apparatus, in combination, means comprising an accumulator for adding promiscuous positive and negative amounts and disclosing positive totals of such additions, means including an auxiliary accumulator for automatically disclosing negative totals of such additions, and means interconnecting the aforesaid accumulators so that both accumulators read zero simultaneously.

10. In a record controlled accounting apparatus, in combination, with record reading means and operating means for automatically presenting records thereto and automatically operating the machine, means comprising a main accumulator controlled by the reading means for adding promiscuous positive and negative amounts derived from the presented records and disclosing positive totals of such additions, means including an auxiliary accumulator controlled by the reading means for disclosing negative totals of such additions, and means to conceal either said main accumulator when the total is negative or said auxiliary accumulator when the total is positive.

11. In an accounting apparatus, a power driven operating means, means comprising a main accumulator automatically operated by said operating means for adding positive and negative amounts in all the orders of said accumulator simultaneously and disclosing positive totals of such additions, means including an auxiliary accumulator also automatically operated by said operating means for obtaining the true negative total during such additions and disclosing the same directly after adding operations, and means to conceal either said main accumulator when the total is negative or said auxiliary accumulator when the total is positive.

12. In a record controlled accounting apparatus, record reading means, means for automatically presenting records thereto and for operating the apparatus, means controlled by the reading means for adding promiscuous positive and negative amounts derived from the said records, and means for disclosing the totals of such additions, such disclosing means including two substantially similar accumulators having register wheels, each register wheel of one accumulator being geared to the corresponding wheel of the other accumulator.

13. In a record controlled accounting apparatus, means for adding promiscuous positive and negative amounts derived from the records, and means for disclosing the totals of such additions, said disclosing means including two substantially similar accumulators having register wheels, each register wheel of one accumulator being geared to the corresponding wheel of the other accumulator and being so numbered that the digit at the reading position of any register wheel is always the complement of the digit at the reading position of the corresponding register wheel in the other accumulator.

14. The invention set forth in claim 13, in which each register wheel of one of said accumulators, except the units wheel, is provided with an auxiliary set of digits so placed that each of said auxiliary digits when at the reading position is the nines complement of the digit at the reading position of the corresponding register wheel of the other accumulator.

15. In a record controlled accounting apparatus, means for adding promiscuous positive and negative amounts derived from the records, and means for disclosing the totals of such additions, said disclosing means including two accumulators and shutter devices operable so the amount in reading position on one of said accumulators is the true complement of the amount in reading position on the other of said accumulators.

16. In a record controlled accounting apparatus, means comprising an algebraic accumulator for adding positive and negative amounts regardless of their relative values derived from the records, means controlled by the records for turning said accumulator forwardly for positive amounts and rearwardly for negative amounts, and said accumulator having provisions for obtaining the true positive and negative balances of said amounts.

17. In a record controlled accounting apparatus, means comprising a main accumulator and an auxiliary accumulator for adding promiscuous positive and negative amounts derived from the records, and means controlled by the records for turning the main accumulator forward for positive amounts and backwards for negative amounts.

18. In a record controlled accounting apparatus, means for adding promiscuous positive and negative amounts derived from the records, and means for disclosing the totals of such additions, said adding means comprising two co-acting accumulators, one of said accumulators having provisions for accumulating positive balances and the other of said accumulators having provisions for accumulating negative balances.

19. In an apparatus for adding promiscuous positive and negative amounts derived from records, in combination, a pair of interconnected accumulators with individual actuating devices therefor, said accumulators being operable by either of said actuating devices, and record controlled means to place either of said actuating devices in control of said accumulators.

20. An accumulator device comprising a dual set of accumulator wheels, independent actuating means for each of said sets of accumulator wheels for entering amounts thereinto, and means for coordinating the actuation of the sets of wheels so that actuation of either of said sets of wheels by its actuating means always effects actuation of the other set, the actuating means of which is ineffective.

21. The invention set forth in claim 20, in which a magnet is provided in said device with means controlled thereby for selectively controlling which set of wheels are to directly receive the entries from their respective actuating means.

22. A record controlled machine having a net balance accumulator device with provisions for pre-controlling the same to add or subtract items, means for sensing an item upon the record, and means for sensing a controlling perforation upon the record in advance of the sensing of said item thereon.

23. A record controlled machine including in combination a net balance accumulator device with provisions for directly displaying the true result whether positive or negative, means for sensing the records to determine the positive or negative character thereof, and means for sensing the amounts upon the records and entering said amounts into the accumulator device in accordance with the character of the record.

24. A record controlled apparatus including an algebraic net balance accumulator device having provision for obtaining true positive and negative balances, means for controlling said device comprising perforation sensing devices with provisions for bringing about adding or subtracting operations by said device according to whether positive or negative records are sensed.

25. The invention set forth in claim 24, in which the perforation sensing devices are adapted to cooperate with record material which is in continuous motion through the apparatus, and in which the control of the accumulator device for adding or subtracting is also effected with the records in motion.

26. An accounting apparatus comprising a net balance accumulator device having differential actuator means for directly entering positive amounts therein, and other differential actuating means for entering negative amounts therein, transfer means for said accumulator device including borrowing means, said borrowing means having provisions for calling said second mentioned differential means into operation to negatively displace the proper elements of the accumulator when borrowing is necessary therein.

27. An accounting device comprising an accumulator, dual sets of differential devices therefor, either of which sets can actuate said accumulator to enter amounts therein, one of said sets of differential devices being utilized for adding positive amounts into said accumulator and the other of said sets being utilized for deducting negative amounts therefrom.

28. In a record controlled machine with provisions for sensing record cards indiscriminately denoting positive and negative amounts, an accumulator device having provisions for automatically entering the amounts sensed from the record cards thereinto, and having provisions for automatically setting up a true number result upon said accumulator device irrespective of the positive or negative character of said result.

29. An accounting device comprising a pair of co-acting accumulators with driving connections therebetween so that either accumulator when driven will drive the other, in combination with independent means for entering items into either accumulator and through and by way of that accumulator entering the items into the other accumulator.

30. The invention set forth in claim 29 in which the driving connections intermediate the accumulators are such that one accumulator is driven in one direction when receiving entries through the other accumulator and in the opposite direction when directly receiving entries.

31. An accounting device comprising a plurality of co-acting accumulators arranged so that either when driven drives the other, independent means for directly entering items into either accumulator, and selective means for selecting the accumulator into which the item is directly entered.

32. An accounting device comprising a plurality of co-acting accumulators arranged so that either when driven drives the other, means for directly entering items into either accumulator, means for suppressing the direct entry of an item into one accumulator upon the direct entry of the item into the other accumulator, and selective means for selecting the accumulator into which an item is directly entered.

33. In an accounting apparatus, means for adding promiscuous positive and negative amounts, and means including a set of accumulator elements for displaying negative totals, each of said accumulator elements, except the units element, being provided with two sets of numerals and shutter mechanism operable to display numerals of one of said sets for all digits to the left of the first significant figure of said negative total, and to display numerals of the other of said sets for all other digits of said total.

34. The invention set forth in claim 33, in which said shutter mechanism is operable by the accumulator element displaying the first significant figure of the negative total.

35. In an accounting apparatus, means for adding positive and negative amounts, and means for disclosing the totals of such additions, said disclosing means including one set of accumulator elements for displaying positive totals and another set of accumulator elements for displaying negative totals, said disclosing means for negative totals also including shutter devices operable conjointly by the element disclosing the first significant figure of the total and by the highest ordinal element of said accumulator.

36. In a record controlled accounting apparatus, means for deriving positive and negative amounts indiscriminately from the records, means controlled thereby for adding said positive and negative amounts, and means for disclosing the totals of such additions, said disclosing means including one set of accumulator elements for displaying positive totals and another set of accumulator elements for displaying negative totals, said disclosing means for negative totals also including shutter devices operable conjointly by the element disclosing the first significant figure of the total and by the highest ordinal element of said accumulator.

37. In an apparatus for adding promiscuous positive and negative amounts derived from records, in combination, a pair of interconnected accumulators with individual actuating devices therefor, said accumulators being operable by either of said actuating devices, record controlled means to place either of said actuating devices in control of said accumulators, and means to hold either actuating device inoperative when the other of said actuating devices is in control.

38. Two coacting accumulators arranged either to drive the other and each accumulator including a plurality of accumulating elements, in combination with a plurality of sets of differential entry means, one set cooperatively related to one set of accumulating elements, and the other set cooperatively related to the other set of accumulating elements and each set of differential devices adapted to effect an initial entry into its coordinated accumulator and through that accumulator to enter the item into the other accumulator.

39. A record controlled accounting machine comprising in combination, a record analyzing means including provisions for sensing amount data perforations upon a record and for sensing a special perforation which is indicative of a special characteristic of the amount data upon the record, whereby promiscuous positive and negative records may be selectively sensed thereby, and accumulating means controlled by the aforesaid sensing means for receiving either positive or negative entries according to the character of the record which is sensed, means for automatically balancing the positive entries against the negative entries as said entries are received to obtain a net balance of said entries, and means for automatically by the operation of the machine affording with said accumulating means a true number reading of said balance irrespective of its positive or negative character.

40. An accounting machine of the record controlled type, adapted to form net balances of positive and negative entries entered therein and including in combination with accumulating devices, data sensing means for sensing data perforated on records as direct number representations irrespective of the positive or negative character of said data, said sensing means further including other means for selectively sensing the records to determine the positive or negative character of the data thereon, and means for selectively controlling the accumulating devices by the aforesaid sensing means to selectively and variably enter therein the data which is derived from the records, and means operably associated with said accumulating devices for automatically providing by the operation of the machine a true number representation of the net balance of the positive and negative entries which are sensed, said last mentioned means including provisions for affording such true number representation irrespective of the positive or negative character of such net balance.

41. An accounting machine of the record controlled type, with provisions for affording a net balance reading of entries of different character which are entered into the machine, said machine comprising accumulating devices which are variably and selectively actuated in accordance with the kind and amount of the data which is entered into the machine, said accumulating devices including provisions for obtaining automatically by the operation of the machine a true number reading of a net balance irrespective of the positive or negative character of such balance, and sensing means for sensing promiscuously presented records which are perforated with direct number perforations representative of amount data of different kinds, said sensing means also having devices for sensing each record to determine the kind of data thereon, and means controlled by the conjoint action of the aforesaid sensing means and devices for selectively controlling the entry of the data into the aforesaid accumulating means according to the kind of data and for also differentially entering into the accumulating devices entries which are coordinated to the amount of such data.

42. In a record controlled machine, record analyzing means, an algebraic totalizer controlled thereby to receive and calculate promiscuous positive and negative items and said totalizer including means for obtaining the correct balance of said items regardless of whether the balance is positive or negative.

43. In a record controlled machine, record analyzing means for concurrently analyzing a plurality of denominational orders of items on records, an algebraic totalizer controlled thereby to receive and calculate promiscuous positive and negative items and said totalizer including means for obtaining the correct balance of said items regardless of whether the balance is positive or negative.

44. In a record controlled machine, means for automatically feeding records through the machine, an algebraic totalizer including means for receiving and calculating promiscuous positive and negative items and means for automatically obtaining the correct balance of said positive and negative items regardless of their relative value and record analyzing means for analyzing records for items and controlling the totalizer accordingly.

45. An algebraic accumulating mechanism for obtaining positive and negative balances, comprising an accumulator for accumulating items to represent a positive balance, and an accumulator for accumulating items to represent a negative balance, separate operating mechanisms for said accumulators, means common to the accumulators adapting either accumulator for operation by the other accumulator instead of by its operating mechanism, and common control means for said operating mechanisms.

46. An algebraic accumulating mechanism for obtaining positive and negative balances comprising a pair of accumulators with coordinating mechanism between them to cause them to operate together, entering mechanism to drive one of said accumulators for entering positive items and separate entering mechanism for driving the other of said accumulators for entering negative items.

47. An algebraic accumulating mechanism for obtaining positive and negative balances, comprising a pair of accumulators with coordinating mechanism for driving each in the opposite direction from the other, entering mechanism to drive one of said accumulators to enter positive items and separate entering mechanism to drive the other accumulator to enter negative items.

In testimony whereof I hereto affix my signature.

CLAIR D. LAKE.